| (12) | United States Patent | (10) Patent No.: | US 8,937,694 B2 |
|---|---|---|---|
| | Kuo et al. | (45) Date of Patent: | Jan. 20, 2015 |

(54) MIDDLE FRAME FOR LCD DEVICE AND LCD DEVICE

(75) Inventors: Yicheng Kuo, Shenzhen (CN); Shihhsiang Chen, Shenzhen (CN); Gege Zhou, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 147 days.

(21) Appl. No.: 13/504,005

(22) PCT Filed: Mar. 29, 2012

(86) PCT No.: PCT/CN2012/073214
§ 371 (c)(1),
(2), (4) Date: Apr. 25, 2012

(87) PCT Pub. No.: WO2013/143091
PCT Pub. Date: Oct. 3, 2013

(65) Prior Publication Data
US 2013/0258228 A1 Oct. 3, 2013

(30) Foreign Application Priority Data
Mar. 27, 2012 (CN) .......................... 2012 1 0083537

(51) Int. Cl.
*G02F 1/1333* (2006.01)
(52) U.S. Cl.
USPC ............... 349/58; 349/65; 362/633; 362/97.2
(58) Field of Classification Search
CPC .......... G02F 1/33308; G02F 1/133615; G02F 1/1333; G02F 2001/133317; G02F 2001/133314; G02F 2001/13332; G02F 2201/503; G09F 13/0413; H04N 5/2251
USPC ............. 349/58, 65; 362/633, 634, 632, 97.1, 362/97.2; 361/829
See application file for complete search history.

(56) References Cited

U.S. PATENT DOCUMENTS

| 5,929,950 A | * | 7/1999 | Matsuda | 349/60 |
| 8,350,983 B2 | * | 1/2013 | Wang et al. | 349/58 |
| 2011/0002112 A1 | * | 1/2011 | Hsu et al. | 361/829 |

FOREIGN PATENT DOCUMENTS

| CN | 1309317 A | 8/2001 |
| CN | 2699331 Y | 5/2005 |

(Continued)

OTHER PUBLICATIONS

Ma Meijuan, The International Searching Authority written comments, Jan. 2013, CN.

*Primary Examiner* — Thoi Duong
(74) *Attorney, Agent, or Firm* — IPro, Inc.; Na Xu

(57) ABSTRACT

The invention provides a middle frame for an LCD device and an LCD device. The middle frame for an LCD device includes a receiving part corresponding to a light incident side of the LCD device, and a buffer part which is fixedly connected with the receiving part and corresponds to the non-light incident side of the LCD device; the receiving part is made of hard material, and the buffer part is made of flexible material. In the invention, because the middle frame is divided into a receiving part and a buffer part, the buffer part is made of flexible material and can be directly used for clamping the light guide panel to position the light guide panel, and the receiving part is made of plastic material which has certain hardness. Thus, the planeness of the whole middle frame can be kept. Furthermore, the position of the receiving part corresponding to the light source is made of plastic material and has certain high temperature resistance. The conventional middle frame is generally injection molded by plastic. However, the die for injection molding has the disadvantages of long manufacture cycle and high cost. The receiving part and the buffer part of the invention can be respectively molded, thereby simplifying the die structure, and favoring cost reduction.

8 Claims, 1 Drawing Sheet

(56) References Cited

FOREIGN PATENT DOCUMENTS

| CN | 101021649 A | 8/2007 |
| CN | 101393351 A | 3/2009 |
| CN | 201351884 Y | 11/2009 |
| CN | 101876758 A | 11/2010 |

\* cited by examiner

MIDDLE FRAME FOR LCD DEVICE AND LCD DEVICE

TECHNICAL FIELD

The invention relates to the field of liquid crystal display (LCD) devices, and more particularly to a middle frame for an LCD device and an LCD device.

BACKGROUND

FIG. 1 shows a conventional LCD device, including a panel 300, and a backlight module; the panel 300 is fixed to the backlight module via front frame(s) 100. The backlight module includes a frame consisting of middle frames 200 and a backplane 700; a light guide panel 500 is supported on the backplane 700, and the light emitting surface of the light guide panel 500 is covered with an optical film 400. The periphery of the backplane 700 is provided with folding rims 710. The folding rim 710 corresponding to the light incident surface of the light guide panel 500 is provided with a lightbar 600, and a heat-conducting adhesive tape 610 is arranged between the lightbar 600 and the folding rim 710 of the backplane 700. The middle frame 200 is provided with an extension part which is arranged between the panel 300 and the light guide panel 500. The light guide panel 500 is mainly fixed by a rivet bolt 800 riveted on a back cover. In the fixing mode, a fixing groove needs to be cut and shaped in the light guide panel 500 to receive the rivet bolt 800, thereby causing processing cost; furthermore, because of the introduction of the rivet bolt 800, hotspot is easy to occur onto the corresponding place of the picture, resulting in poor optical quality; particularly, hotspot is easy to occur in the device with a narrow frame, and the problem is difficult to solve. In addition, in the shock process for a reliability experiment, the place for the light guide panel 500 to receive the rivet bolt is easy to break.

SUMMARY

In view of the above-described technical problems, the aim of the invention is to provide a middle frame for an LCD device and an LCD device with advantages of low cost and better effect for positioning a light guide panel.

The purpose of the invention is achieved by the following technical scheme.

A middle frame for an LCD device comprises a receiving part corresponding to a light incident side of the LCD device, and a buffer part which is fixedly connected with the receiving part and corresponds to a non-light incident side of the LCD device; the receiving part is made of hard material, and the buffer part is made of flexible material.

Preferably, the flexible material is a foam material; the foam material has the advantages of low density, light weight, and good buffer performance, thereby favoring the lightening and thinning of the LCD device.

Preferably, the hard material is a plastic material; the plastic material has certain hardness and light weight, thereby favoring the lightening and thinning of the device; furthermore, the temperature at the light source side is high, the plastic material used has a certain high temperature resistance.

Preferably, the receiving part and the buffer part are fixed via joining; thus, the die structure of the middle frame can be simplified, the cost of die sinking can be reduced, and the cycle of die making can be shortened.

Preferably, the middle frame is in a rectangle shape, one rim of the rectangle middle frame is the receiving part, and the other three rims are the buffer part; the three rims of the buffer part are integratedly molded; thus, the assembling step can be omitted, and the production cost can be reduced.

Preferably, the middle frame is in a rectangle shape, one rim of the rectangle middle frame is the receiving part, and the other three rims are the buffer part; the three rims of the buffer part are fixed by sticking, clamping, riveting, or screwing. Thus, the die structure of the middle frame can be simplified, the cost of die sinking can be reduced, and the cycle of die making can be shortened. In addition, each rim only needs fixing to the backplane of the LCD device, and the fixing mode is simple, thereby improving the production efficiency.

Preferably, the receiving part and the buffer part are integratedly molded. The receiving part and the buffer part of different material can be integratedly molded by some process; thus, the assembling step can be omitted, and the production cost can be reduced.

An LCD device comprises a backplane, and a light guide panel supported on the backplane; the backplane is provided with a light source assembly in the position corresponding to the light incident surface of the light guide panel, and the periphery of the backplane is fixed with middle frame(s) for an LCD device.

Preferably, the edge of the light guide panel is butted with the buffer part of the middle frame. This is a matching structure of the light guide panel and the middle frame. The edge of the light guide panel is butted with the buffer part. The multiple rims of the buffer part clamp the light guide panel to position the light guide panel, and the buffer part is made of flexible material to better protect the light guide panel in the process of impact and shake.

Preferably, the periphery of the backplane is provided with a folding rim, and the bottom of the buffer part of the middle frame is provided with a groove for insertion of the folding rim. This is a fixing structure of the buffer part and the backplane. After the folding rim of the backplane is inserted in the groove, the part exposed outside is two groove walls of the groove of the buffer part, one groove wall positioned inside the backplane is used for positioning the light guide panel, and the other groove wall is used for fixing the front frame of the LCD device. Thus, multiple functions can be achieved by only one positioning structure.

In the invention, because the middle frame is divided into a receiving part and a buffer part, the buffer part is made of flexible material and can be directly used for clamping the light guide panel. Because the flexible material has high buffer performance, the light guide panel does not need additionally grooving for positioning; thus, the phenomenon that the light guide panel is broken by the rivet bolt in the process of various experiments and transportation is avoided, and the light guide panel is reliably positioned. Furthermore, the receiving part is made of hard material, so that the planeness of the whole middle frame can be kept. The conventional middle frame is generally injection molded by plastic. However, the die for injection molding has the disadvantages of long manufacture cycle and high cost. The receiving part and the buffer part of the invention can be respectively molded, thereby simplifying the die structure, and favoring cost reduction.

Wherein: 100. front frame; 200. middle frame; 210. receiving part; 220. buffer part; 230. groove; 300. panel; 400. optical film; 500. light guide panel; 600. lightbar; 610. heat-conducting adhesive tape; 700. backplane; 710. folding rim; 800. rivet bolt.

DETAILED DESCRIPTION

The invention will further be described in detail in accordance with the figures and the preferred examples.

Figure 1:
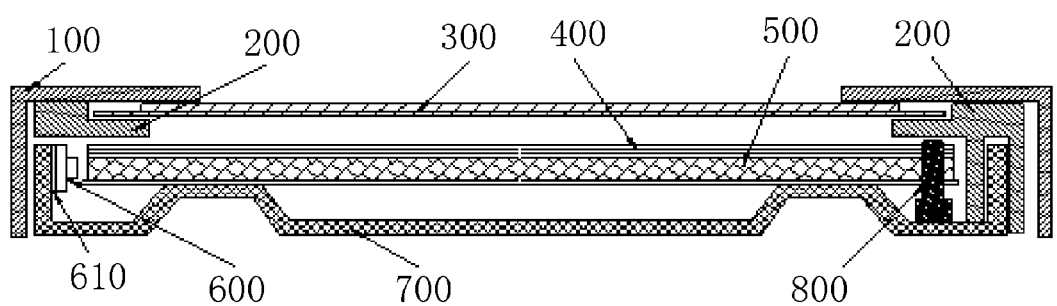
FIG. 1 is a schematic diagram of a conventional LCD device.
Figure 2:
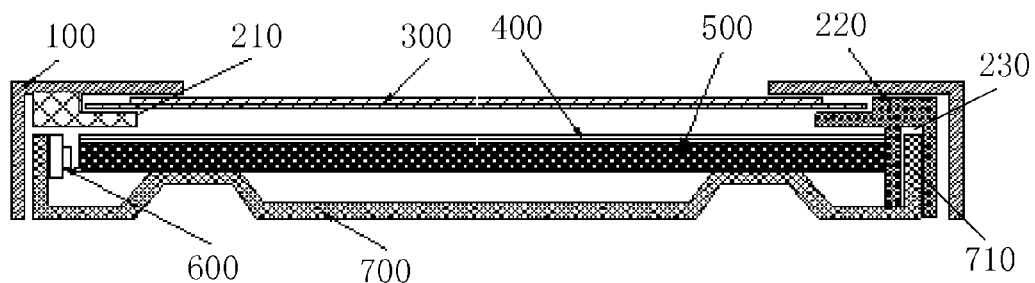
FIG. 2 is a schematic diagram of an LCD device of an example of the invention.

As shown in FIG. 2, the invention comprises a panel 300, and backlight module; the panel 300 is fixed to the backlight module via front frame(s) 100. The backlight module comprises a frame consisting of middle frames 200 and a backplane 700; a light guide panel 500 is supported on the backplane 700, the light emitting surface of the light guide panel 500 is covered with an optical film 400. The periphery of the backplane 700 is provided with folding rims 710, the position of the light incident surface of the light guide panel 500 corresponding to the folding rim 710 is provided with a light source assembly, and a light emitting diode (LED) lightbar 600 can be used as the light source assembly. The periphery of the backplane 700 is fixed with middle frame(s) 200 of the aforementioned LCD device. The middle frame 200 is provided with an extension part which is arranged between the panel 300 and the light guide panel 500.

The middle frame 200 is in a rectangle shape. A receiving part 210 is arranged on one rim of the middle frame 200 corresponding to the light incident side of the LCD device, and a buffer part 220 is arranged on the other three rims of the middle frame 200 corresponding to a non-light incident side of the LCD device; the receiving part 210 is made of hard material such as plastic material, etc., and the buffer part 220 is made of flexible material.

The edge of the light guide panel 500 is butted with the buffer part 220 of the middle frame 200, the multiple rims of the buffer part 220 clamp the light guide panel 500 to position the light guide panel 500, and the buffer part 220 is made of flexible material to better protect the light guide panel 500 in the process of impact and shake.

The bottom of the buffer part 220 of the middle frame 200 is provided with a groove 230 for insertion of the folding rim 710 of the backplane 700; after the folding rim 710 of the backplane 700 is inserted in the groove 230, the part exposed outside is two groove walls of the groove 230 of the buffer part 220, one groove wall positioned inside the backplane 700 is used for positioning the light guide panel 500, and the other groove wall is used for fixing the front frame 100 of the LCD device. Thus, multiple functions can be achieved by only one positioning structure.

Further, the flexible material is a foam material; the foam material has the advantages of low density, light weight, and good buffer performance, thereby favoring the lightening and thinning of the LCD device.

The receiving part 210 and the buffer part 220 of the middle frame 200 can be integratedly molded; thus, the assembling step can be omitted, and the production cost can be reduced. Optionally, the receiving part 210 and the buffer part 220 can be fixed via joining; thus, the die structure of the middle frame 200 can be simplified, the cost of die sinking can be reduced, and the cycle of die making can be shortened. Similarly, the three rims of the buffer part 220 can be integratedly molded, and can be fixed by the mode such as sticking, clamping, riveting, or screwing. Preferably, the fixing mode of separate joining is used. Thus, the die structure of the middle frame 200 can be simplified, the cost of die sinking can be reduced, and the cycle of die making can be shortened. In addition, each rim only needs fixing to the backplane 700 of the LCD device; the fixing mode is simple, thereby improving the production efficiency.

Because the middle frame 200 of the invention is divided into a receiving part 210 and a buffer part 220, and the middle frame which is made of foam material and has good elasticity and good buffer function is used on a non-light incident side, and is arranged between the light guide panel and the back cover; the light guide panel is tightly matched with the middle frame during assembling; thus, when the light guide panel is expanded while being affected by the heat or damp, the middle frame can absorb the expansion quantity of the light guide panel; after the external environment returns to normal, the light guide panel is restored to normal position by the elasticity of the middle frame. In addition, by using the middle frame made of foam material, the rivet bolt can be removed, the problem of poor optical quality of the light guide panel cannot occur without cutting and processing the light guide panel, and the design of narrow frames can be easily achieved. Because the plastic middle frame is used on the light incident side, the planeness of the whole middle frame after joining is kept.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

We claim:

1. An LCD device, comprising: a backplane, and a light guide panel supported on the backplane; wherein said backplane is provided with a light source assembly in the position corresponding to a light incident surface of said light guide panel; the periphery of said backplane is fixed with middle frame(s) comprising a receiving part corresponding to a light incident side of the LCD device, and a buffer part which is fixedly connected with said receiving part and corresponds to the light incident side of said LCD device; said receiving part is made of hard material, and said buffer part is made of flexible material, wherein the periphery of said backplane is provided with a folding rim, and the bottom of the buffer part of said middle frame is provided with a groove for insertion of said folding rim, the receiving part and the buffer part being located at two opposite ends of the light guide panel, and wherein said middle frame is in a rectangle shape, one rim of said rectangle middle frame is said receiving part only, and the other three rims are said buffer part.

2. The LCD device of claim 1, wherein said flexible material is a foam material.

3. The LCD device of claim 1, wherein said hard material is a plastic material.

4. The LCD device of claim 1, wherein said receiving part and said buffer part are fixed via joining.

5. The LCD device of claim 4, wherein the three rims of said buffer part are integratedly molded.

6. The LCD device of claim 4, wherein the three rims of said buffer part are fixed by the mode of sticking, clamping, riveting, or screwing.

7. The LCD device of claim 1, wherein said receiving part and said buffer part are integratedly molded.

8. The LCD device of claim 1, wherein the edge of said light guide panel is butted with the buffer part of said middle frame.

* * * * *